May 3, 1960   G. E. FRANKE ET AL   2,935,054
FUEL INJECTION INTERNAL COMBUSTION ENGINE
Filed Feb. 21, 1958   5 Sheets-Sheet 1

INVENTOR
Gerhard Franke
Otto Elwert

May 3, 1960  G. E. FRANKE ET AL  2,935,054
FUEL INJECTION INTERNAL COMBUSTION ENGINE
Filed Feb. 21, 1958  5 Sheets-Sheet 2

INVENTOR
Gerhard Franke
Otto Elwert
By
Patent Agent

May 3, 1960  G. E. FRANKE ET AL  2,935,054
FUEL INJECTION INTERNAL COMBUSTION ENGINE
Filed Feb. 21, 1958  5 Sheets-Sheet 3

INVENTOR
Gerhard Franke
Otto Elwert
By
Patent Agent

May 3, 1960   G. E. FRANKE ET AL   2,935,054
FUEL INJECTION INTERNAL COMBUSTION ENGINE
Filed Feb. 21, 1958   5 Sheets-Sheet 4

INVENTOR
Gerhard Franke
Otto Elwert
By
Patent Agent

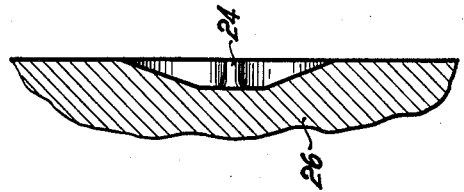
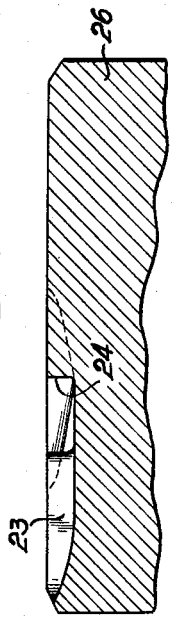
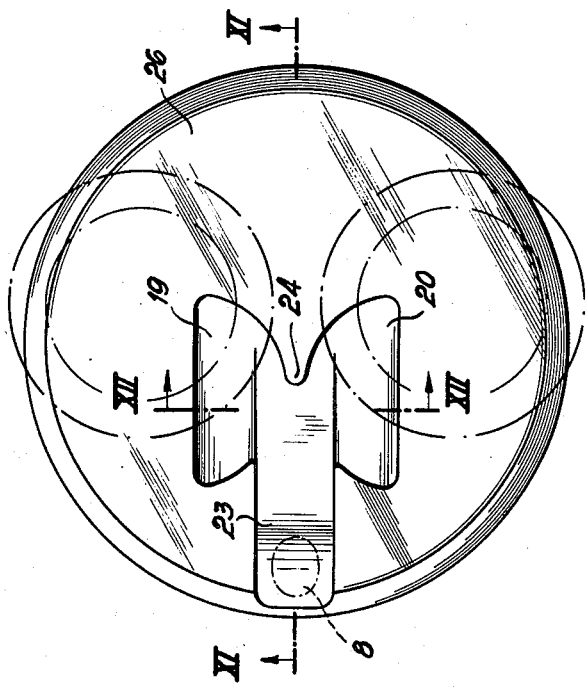

United States Patent Office 2,935,054
Patented May 3, 1960

2,935,054

FUEL INJECTION INTERNAL COMBUSTION ENGINE

Gerhard E. Franke, Koln-Dellbruck, and Otto Elwert, Koln-Lindenthal, Germany, assignors to Klockner-Humboldt-Deutz Aktiengesellschaft, Koln, Germany Application February 21, 1958, Serial No. 716,627

Claims priority, application Germany March 8, 1957

5 Claims. (Cl. 123—32)

The present invention relates to a four-stroke cycle fuel injection internal combustion engine, especially to an air cooled engine of this type in which the combustion air compressed in the working cylinder is with the exception of a minimum portion received by two pre-combustion chambers. One of the said two combustion chambers into which the fuel is injected, is arranged in the cylinder head and communicates with the cylinder chamber through a throat which is inclined to the top surface of the piston and when viewing in the direction of the axis of the cylinder extends at a right angle or nearly at a right angle to a plane passing through the axis of the inlet and outlet valves. The said throat extends in a direction toward or nearly toward the axis of said cylinder and at the bottom side of the cylinder head leads into the cylinder chamber near the circumference of the cylinder bore. The other pre-combustion chamber is formed by a recess in the top of the piston and is so arranged and shaped that the hot combustion gases passing from the pre-combustion chamber in the cylinder head into the cylinder chamber first flow toward the wall portion or bridge between the valve openings in the cylinder head but at a certain distance from said wall portion or bridge are caught by the circumferential wall of said recess which may also be called "deflecting wall" and, when viewing in the direction of the piston axis toward the top of the piston, are deviated or deflected either toward one side or toward both sides into a whirl pocket or two whirl pockets respectively. In other words, in the last mentioned instance half of the combustion gases flows into one whirl pocket while the other half flows into the other whirl pocket.

With engines of the above mentioned type, the hot gases flowing from the pre-combustion chamber in the cylinder head into the pre-combustion chamber in the piston will heat said wall portion or bridge between the inlet and outlet valve. However, this heating up of said bridge will be the less the deeper (when viewed in the direction of the piston axis) the said pre-combustion chamber in the top of the piston is designed within the deflecting range of said deflecting wall. The reason for this is seen in the fact that with decreasing depth in the said deflecting range, a portion of the hot gases to be caught will to an increasing extent flow over the edge of said deflecting wall into the cylinder chamber below the bridge and will directly heat up the latter.

It is, therefore, an object of the present invention so to design the pre-combustion chamber in the top of the piston that as small a portion as possible of the arriving hot gases will pass below said bridge.

It is another object of this invention to provide an internal combustion engine of the type set forth in the preceding paragraph, in which for a given volume, the recess forming the pre-combustion chamber in the top of the piston is as deep as possible within the range in which the hot gases received from the pre-combustion chamber in the cylinder head are caught and deflected.

It is still another object of this invention to provide an internal combustion engine of the above mentioned type, in which the heating up of the wall portion or bridge in the cylinder head between the valve openings in the cylinder head will be considerably reduced.

It is also an object of this invention to provide an internal combustion engine with a pre-combustion chamber in the cylinder head and another pre-combustion chamber in the top of the piston, in which heat accumulations in the marginal portions confining the pre-combustion chamber in the piston will be avoided for all practical purposes.

These and other objects and advantages of the invention will appear more clearly from the following specification in connection with the accompanying drawings, in which:

Fig. 10 is a top view of the piston of still another embodiment of the invention.

Fig. 11 represents a section along the line XI—XI of Fig. 10.

Fig. 12 is a section along the line XII—XII of Fig. 10.

General arrangement

Figure 1:
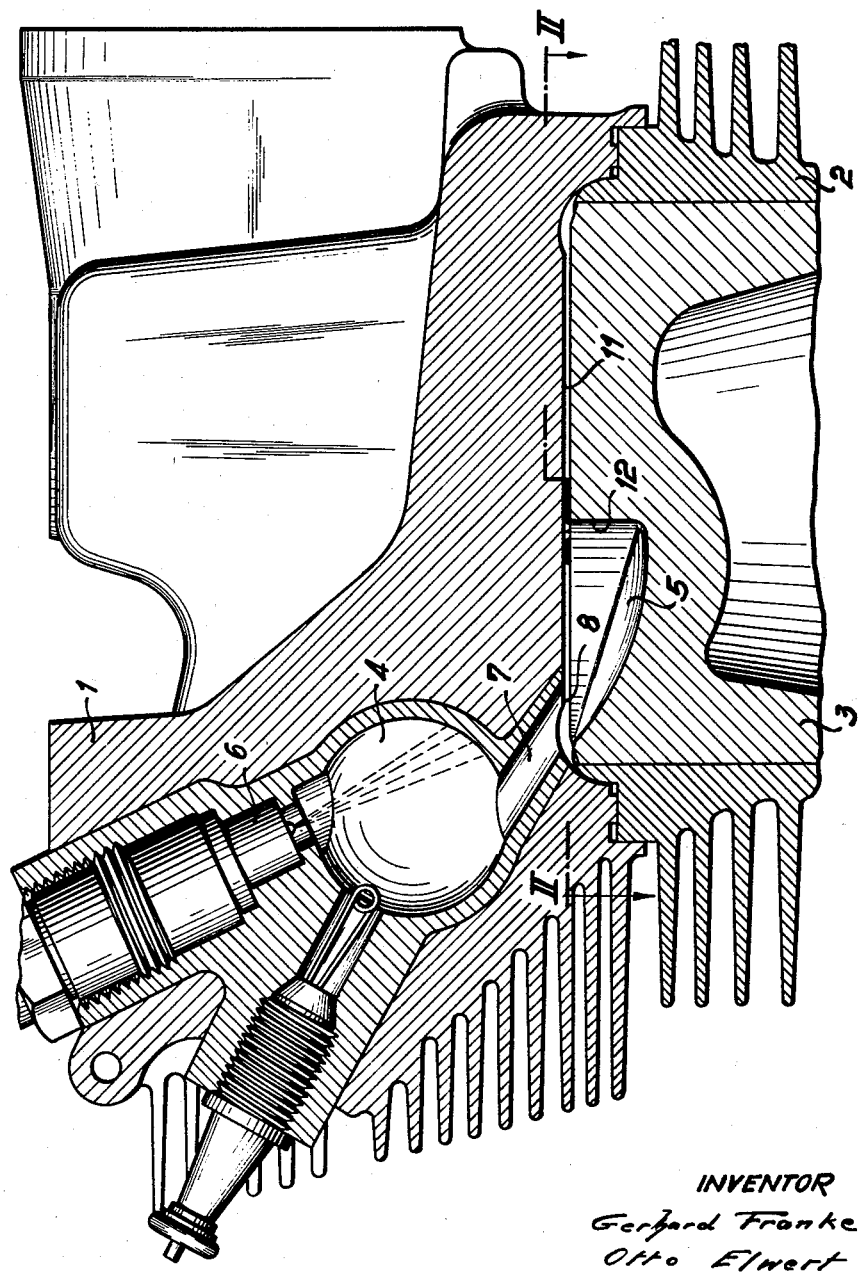
Fig. 1 illustrates a section through a cylinder head and the upper portion of a piston according to the present invention.

According to the present invention, the pre-combustion chamber in the top of the piston is so designed that the bottom of said pre-combustion chamber declines in a direction away from the entrance points of the gases entering said pre-combustion chamber and then, near the deepest portion of said pre-combustion chamber, merges with a steep ascending wall which may be called the "deflecting wall" for the hot gases entering said pre-combustion chamber. In this connection, the bottom of the pre-combustion chamber in the piston may at certain portions, especially near said deflecting wall extend parallel to the piston bottom and in the ascending portion may extend along a plane or curved section. In addition to counteracting too strong a heating up of the wall portion in the cylinder head between the valve openings, the pre-combustion chamber according to the present invention in the piston has also further advantages. Thus, due to the less sharp merging between the piston surface and the bottom of the pre-combustion chamber in the piston, the passage of the deviated hot gases from the last mentioned pre-combustion chamber into the remaining cylinder chamber is greatly facilitated. Furthermore, heat accumulations in the marginal portions of the piston which confine the pre-combustion chamber in the piston are avoided for all practical purposes. With the arrangement according to the present invention, the surface at the piston edge will be heated to a considerably less extent, and consequently more cross section is available for conducting the heat away to the open piston end.

The pre-combustion chamber in the piston may be of different shape. Thus, in conformity with the present invention the said pre-combustion chamber may consist of a single recess which seen in the direction of the piston axis toward the top of the piston may have a round, preferably circular contour symmetrical to the direction of flow of the gases to be received by the said recess.

According to a further development of the invention, the hot gases entering the pre-combustion chamber in the piston are conveyed to a deflecting wall through a trough-like channel extending from the throat in the cylinder toward the piston axis. At the said deflecting wall, the hot gases are conveyed into a single whirl pocket which when viewing in the direction of the piston axis toward the surface of the piston is arranged laterally of the said trough-shaped passage. This unilateral whirl pocket is expediently arranged on that side on which the inlet valve is located so that the heat stresses of the cylinder head are possibly uniformly distributed.

Instead of a single unilateral whirl pocket, it is also possible to provide two whirl pockets arranged laterally and symmetrically with regard to said trough-shaped passage. The said two whirl pockets may preferably have a circular contour while the deflecting wall is preferably equipped with a nose protruding into the said trough-shaped passage against the direction of the oncoming gases. This nose splits up the oncoming gas stream and has flanks gradually merging with the circumferential wall of the whirl pockets.

The arrangement of a single whirl pocket has the advantage that due to the reduced surface, the piston is heated to a less extent while the compressed air or the compressed gases are cooled to a less extent.

*Structural arrangement*

Figure 2:
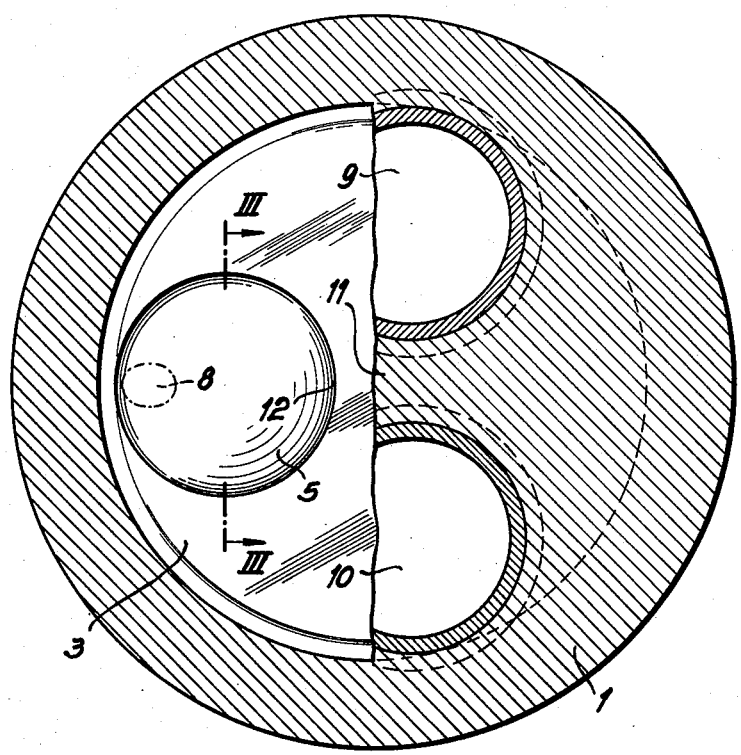
Fig. 2 is a section through the cylinder head of Fig. 1, said section being taken along the line II—II of Fig. 1.

Referring now to the drawings in detail, and Fig. 1 thereof in particular, the structure shown therein comprises a cylinder head 1 and the upper portion of the cylinder 2 of an air cooled four-stroke cycle internal combustion engine. The piston 3 reciprocably mounted in the cylinder 2 has a plane top surface adapted at the upper dead center point closely to approach the cylinder head bottom. The arrangement shown in Fig. 1 furthermore comprises two pre-combustion chambers 4 and 5 each of which is adapted at the end of the compression stroke to receive about half of the compressed air. The pre-combustion chamber 4 into which by means of a nozzle 6 also the fuel is injected is arranged in the cylinder head and is of approximately ball shape. The pre-combustion chamber 4 is connected with the cylinder chamber through a throat 7 tangentially leading into the chamber 4 which latter works as whirl chamber in a manner known per se. The throat 7 is inclined to the top surface of the piston 3 and, as will be evident from Fig. 2 showing the throat mouth 8 adjacent the cylinder by a dot-dash line extends in a direction toward the longitudinal axis of the cylinder. The mouth 8 is arranged near the circumference of the cylinder bore and when the piston 3 is in its upper dead center position, is located above the second pre-combustion chamber 5 which when viewing in the direction of the piston axis toward the piston top forms a circularly delimited recess. The hot gases which after the combustion in the pre-combustion chamber 4 pass through throat 7 into the chamber 5 are conveyed in the latter along a straight path to a wall 12 which is arranged at a certain spaced location from the narrowest portion between the openings 9 and 10 which are the openings for the inlet and outlet valves in the cylinder head. In other words, the hot gases are conveyed to a wall 12 which may be called the deflecting wall and which is located in spaced arrangement to and ahead of the wall portion 11 which may be called a bridge. The hot gases conveyed to the deflecting wall 12 pass along the said wall, and one-half each of said gases is deviated to the two portions of the chamber 5 which are symmetrically arranged to the oncoming gas stream.

Figure 3:
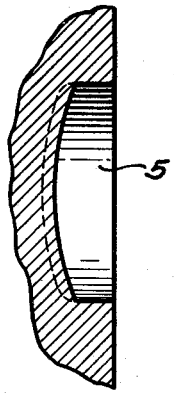
Fig. 3 is a section along the line III—III of Fig. 2.

In the said portions of chamber 5, there is effected a strong whirl and intermixing of the hot combustion gases with the compressed air in said chamber portions so that an intimate mixing of the said two media will be effected. The ball-shaped bottom of the pre-combustion chamber 5 is so designed that the deepest portion thereof is located within the range of i.e. near the deviating wall or deflecting wall 12. The bottom then ascends gradually from the central range to all sides toward the top surface of the piston. This contour of the bottom of chamber 5 will best be seen from Fig. 3.

Figure 4:
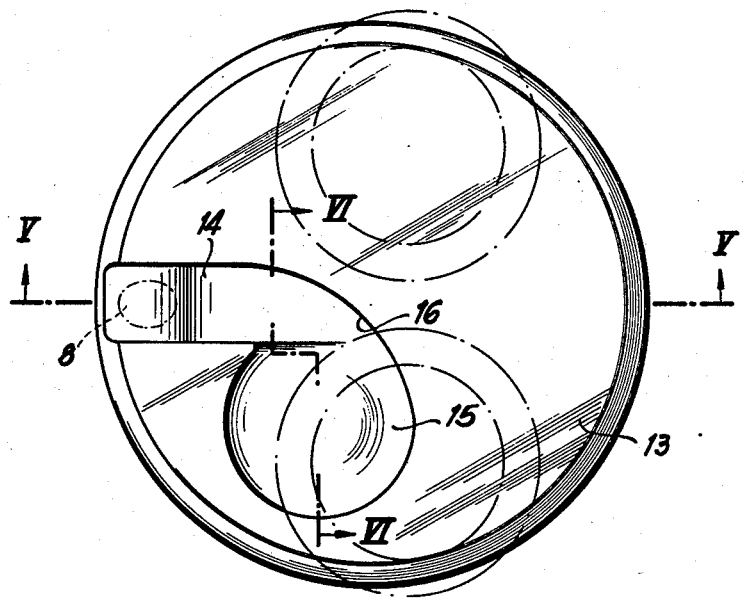
Fig. 4 is a top view of a piston according to a further embodiment of the invention.

Fig. 4 shows a modified piston 13 with a different pre-combustion chamber. As will be evident from Fig. 4, the pre-combustion chamber of piston 13 comprises a trough-shaped passage 14 through which the hot gases arriving from the pre-combustion chamber in the cylinder head are conveyed first in the direction toward the wall portion or bridge 11 of the cylinder head and at a certain distance therefrom are in their entirety deviated into a whirl pocket 15 laterally of the passage 14. The whirl pocket is of circular contour when looking in the direction of the piston axis upon the top surface of the piston. The bottom of the pre-combustion chamber composed of the channel or passage 14 and the whirl pocket 15 ascends from the deviating range or deflecting wall 16 in all directions toward the top surface of the piston (see Figs. 5 and 6). The deepest spot of the pre-combustion chamber is located near the deviating or deflecting wall 16.

Figure 5:
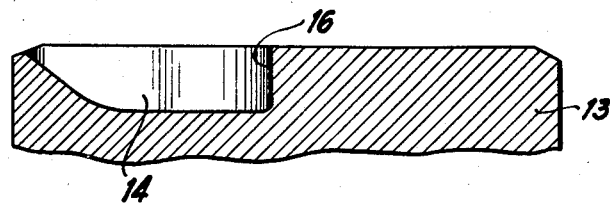
Fig. 5 represents a section along the line V—V of Fig. 4.
Figure 6:
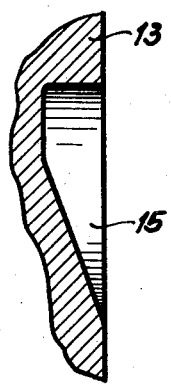
Fig. 6 illustrates a section along the line VI—VI of Fig. 4.

The pistons 25 and 26 of Figs. 7 to 9 and 10 to 12 respectively differ from the piston of Figs. 4 to 6 in that instead of a single whirl pocket laterally of the passage or channel conveying the hot gases into said pocket, there are arranged two whirl pockets 17 and 18, and 19 and 20 respectively. The two pockets in each instance are symmetrically arranged with regard to the respective passage 21 and 23. The deviation or deflection is effected by means of a nose 22 and 24 respectively which protrudes into the passage 21 and 23 respectively.

Figure 7:
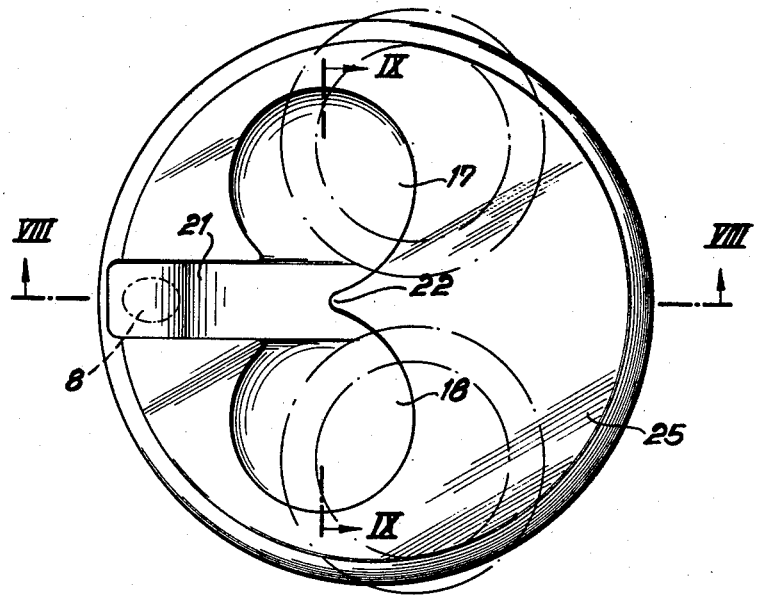
Fig. 7 is a further embodiment of a piston according to the invention.
Figure 8:
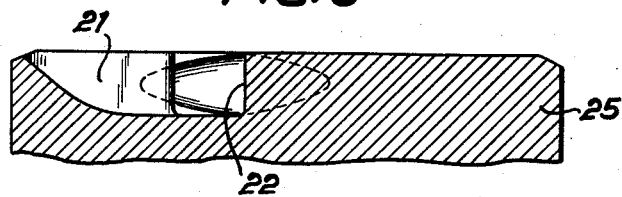
Fig. 8 represents a section along the line VIII—VIII of Fig. 7.
Figure 9:
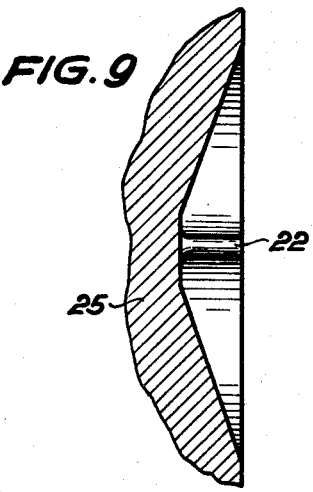
Fig. 9 is a section along the line IX—IX of Fig. 8.

The piston according to Figs. 10 to 12 differs from that of the piston of Figs. 7 to 9 in that the pre-combustion chamber 19, 20, 23 of Figs. 10 to 12 is not as deep as the pre-combustion chamber of the piston of Figs. 7 to 9, while the general contour of the bottom surface of the pre-combustion chamber in said piston is the same in both instances. The piston according to Figs. 10 to 12 therefore has a pre-combustion chamber of less volume so that an increased compression is obtained.

It is, of course, to be understood that the present invention is, by no means, limited to the particular constructions shown in the drawings but also comprises any modifications within the scope of the appended claims. Thus, while the invention has been described in connection with engines with two valves only namely an inlet and an outlet valve for each cylinder head, it is, of course, evident that the invention can appropriately be employed in connection with engines having more than two valves.

What we claim is:

1. In a fuel injection internal combustion engine: a cylinder head having an inlet and an outlet valve opening and a wall portion therebetween and also having a first pre-combustion chamber for receiving the injected fuel; a cylinder having a cylinder bore; a piston reciprocable in said cylinder bore and having a piston top provided with a depression open toward said cylinder head and forming a second pre-combustion chamber; a throat passage provided in said cylinder head and extending from said first pre-combustion chamber and through the bottom of said cylinder head near the peripheral portion of said cylinder bore, said throat passage extending at an incline to said piston top and at least nearly perpendicular to the plane passing through the axes of said inlet and outlet valve openings; said piston, when occupying its position closest to said cylinder head, having a portion of said second pre-combustion chamber near said throat passage to thereby convey combustion gases from said first pre-combustion chamber through said throat passage to said second pre-combustion chamber; said second pre-combustion chamber having a deflecting wall arranged in spaced relationship to and substantially opposite to the entrance area where the gases from said throat passage enter said second pre-combustion chamber; said deflecting wall being spaced from and being located ahead of said wall portion, when looking in the direction of flow of said combustion gases from said throat into said second pre-combustion chamber toward said wall portion, for laterally deflecting the combustion gases received by said second pre-combustion chamber; said second pre-combustion chamber having its greatest depth near said deflecting wall and having a bottom ascending from the area of said deflecting wall toward said piston top portion at said entrance area.

2. A fuel injection internal combustion engine according to claim 1, in which said second pre-combustion chamber when viewing the same from the top in the direction of the piston axis has a round contour.

3. A fuel injection internal combustion engine according to claim 1, in which said second pre-combustion chamber when viewing the same from the top in the direction of the piston axis has a substantially circular contour and is arranged symmetrically with regard to the direction of the oncoming gases from said first pre-combustion chamber.

4. In a fuel injection internal combustion engine: a cylinder head having an inlet and an outlet valve opening and a wall portion therebetween and also having a first pre-combustion chamber for receiving the injected fuel; a cylinder having a cylinder bore; a piston reciprocable in said cylinder bore and having a piston top provided with a depression open toward said cylinder head and forming a second pre-combustion chamber; a throat passage provided in said cylinder head and extending from said first pre-combustion chamber and through the bottom of said cylinder head near the pheripheral portion of said cylinder bore, said throat passage extending at an incline to said piston top and at least nearly perpendicular to the plane passing through the axes of said inlet and outlet valve openings; said piston, when occupying its position closest to said cylinder head, having a portion of said second pre-combustion chamber near said throat passage to thereby convey combustion gases from said first pre-combustion chamber through said throat passage to said second pre-combustion chamber; said second pre-combustion chamber having a deflecting wall arranged in spaced relationship to and substantially opposite to the entrance area where the gases from said throat passage enter said second pre-combustion chamber; said deflecting wall being spaced from and being located ahead of said wall portion, when looking in the direction of flow of said combustion gases from said throat into said second pre-combustion chamber toward said wall portion, for laterally deflecting the combustion gases received by said second pre-combustion chamber; said second pre-combustion chamber comprising a trough-shaped passage extending up to said deflecting wall and also comprising a whirl pocket arranged laterally of said trough-shaped passage and having a bottom ascending from the area of said deflecting wall toward said piston top in the direction of the longitudinal extension of said trough-shaped passage.

5. In a fuel injection internal combustion engine: a cylinder head having an inlet and an outlet valve opening and a wall portion therebetween and also having a first pre-combustion chamber for receiving the injected fuel; a cylinder having a cylinder bore; a piston reciprocable in said cylinder bore and having a piston top provided with a depression open toward said cylinder head and forming a second pre-combustion chamber; a throat passage provided in said cylinder head and extending from said first pre-combustion chamber and through the bottom of said cylinder head near the peripheral portion of said cylinder bore, said throat passage extending at an incline to said piston top and at least nearly perpendicular to the plane passing through the axes of said inlet and outlet valve openings; said piston, when occupying its position closest to said cylinder head, having a portion of said second pre-combustion chamber near said throat passage to thereby convey combustion gases from said first pre-combustion chamber through said throat passage to said second pre-combustion chamber; said second pre-combustion chamber having a deflecting wall arranged in spaced relationship to and substantially opposite to the entrance area where the gases from said throat passage enter said second pre-combustion chamber; said deflecting wall being spaced from and being located ahead of said wall portion, when looking in the direction of flow of said combustion gases from said throat into said second pre-combustion chamber toward said wall portion, for laterally deflecting the combustion gases received by said second pre-combustion chamber; said second pre-combustion chamber comprising a trough-shaped passage leading from the piston top at said entrance area to said deflecting wall and also comprising two whirl pockets arranged on opposite sides of said trough-shaped passage and symmetrical thereto; said deflecting wall having a nose protruding into said trough-shaped passage and merging with said whirl pockets for splitting up the oncoming gases in said trough-shaped passage.

References Cited in the file of this patent

FOREIGN PATENTS

| | | |
|---|---|---|
| 713,618 | Germany | Nov. 11, 1941 |
| 767,570 | Germany | Sept. 15, 1952 |
| 783,053 | Great Britain | Sept. 18, 1957 |